United States Patent
Campbell et al.

[11] Patent Number: 5,629,417
[45] Date of Patent: May 13, 1997

[54] PHTHALOCYANINES

[75] Inventors: James S. Campbell, Whitefield; Peter Gregory, Bolton; Dean Thetford, Rochdale, all of United Kingdom

[73] Assignee: Zeneca Limited, London, England

[21] Appl. No.: 594,412

[22] Filed: Jan. 31, 1996

Related U.S. Application Data

[62] Division of Ser. No. 277,760, Jul. 20, 1994, Pat. No. 5,516,899.

[30] Foreign Application Priority Data

Jul. 29, 1993 [GB] United Kingdom ............... 9315692

[51] Int. Cl.$^6$ .................................................. C07D 487/22
[52] U.S. Cl. .................................... 540/122; 540/139
[58] Field of Search ............................. 540/122, 139

[56] References Cited

U.S. PATENT DOCUMENTS

| | | | |
|---|---|---|---|
| 2,832,789 | 4/1958 | Zerweck et al. | 540/140 |
| 3,622,557 | 11/1971 | Sailor et al. | 540/132 |
| 3,651,058 | 3/1972 | Poole | 540/132 |
| 5,302,708 | 4/1994 | Beck et al. | 540/135 |

OTHER PUBLICATIONS

Yoshitoshi et al, Chem. Abs. 121:59680s (1994).

*Primary Examiner*—Mukund J. Shah
*Assistant Examiner*—Pavanaram K. Sripada
*Attorney, Agent, or Firm*—Cushman Darby & Cushman IP Group Pillsbury Madison & Sutro LLP

[57] ABSTRACT

A phthalocyanine of Formula (1):

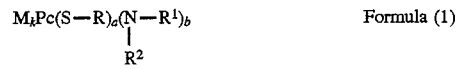

wherein:

$M_kPC$ is a phthalocyanine nucleus of Formula (2):

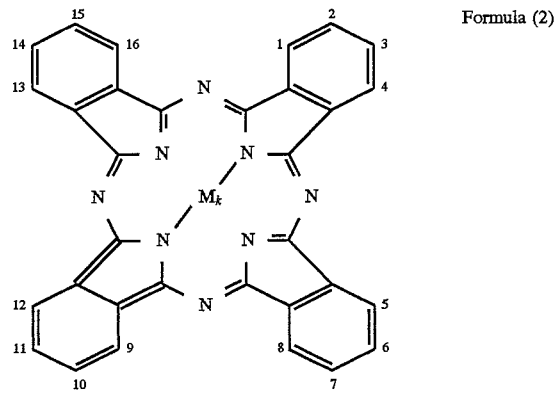

M is a metal atom, a chloro-metal group, and oxy-metal group or hydrogen;

k is inverse of ½ valency of M; R and $R^1$ each independently is an organic radical;

$R^2$ is H or optionally substituted alkyl;

a is an average value from 15 to 8;

b is an average value from 1 to 8; and a+b is from 15 to 16; and sulphonated derivatives thereof and process for their preparation.

The phthalocyanines of the present invention are useful for absorbing electro-magnetic radiation from for example a laser source and may be used in a coating for optical data storage disks, or in security applications such as printing banknotes or cheques, or in the preparation of lithographic printing plates or in washing powders to assist in bleaching.

1 Claim, No Drawings

PHTHALOCYANINES

This application is a Division of Ser. No. 08/277760 filed Jul. 20, 1994, now patented as U.S. Pat. No. 5,516,899.

This invention relates to phthalocyanines, particularly to phthalocyanines having arylthio and arylamino substituents, more particularly to those having copper, manganese or iron as the central metal atom and to a process for preparing such phthalocyanines.

According to the present invention there is provided a phthalocyanine of Formula (1):

Formula (1)

wherein:

$M_kPC$ is a phthalocyanine nucleus of Formula (2):

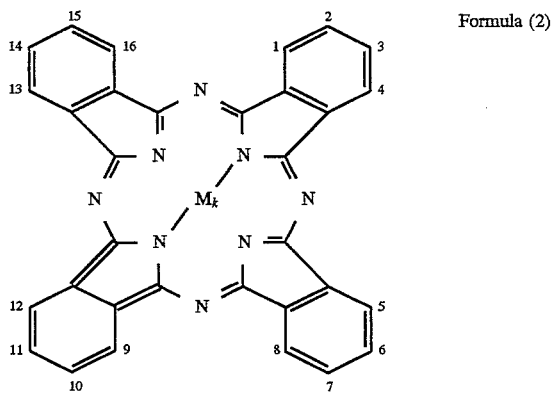

Formula (2)

M is a metal atom, a chloro-metal group, and oxy-metal group or hydrogen;

k is inverse of ½ valency of M; R and $R^1$ each independently is an organic radical;

$R^2$ is H or optionally substituted alkyl;

a is an average value from 15 to 8;

b is an average value from 1 to 8; and a+b is from 15 to 16; and sulphonated derivatives thereof.

Preferred phthalocyanines of the present invention are those which have a maximum absorbance (λmax) from 800 to 1000 nm, more preferably from 800 to 900 nm.

The phthalocyanine nucleus may be metal free i.e. M is hydrogen, or it may be complexed with a metal, a halo-metal group or an oxy-metal group. Suitable metals, halo-metal groups and oxy-metal groups are those of Groups IA, IIA, IIIB, IVB, those of the 1st, 2nd and 3rd transition metals and the lanthanide series of the Periodic Table. Preferred metals, halo-metal groups and oxy-metal groups are those in which the metal is selected from, copper, manganese, iron, zinc, cobalt, aluminium and titanium, more preferably those selected from copper, manganese, iron, zinc and cobalt and especially copper.

In halo-metal groups suitable halo atoms are —Cl, —F, —Br and —I preferably —Cl, —F and —Br giving a halo-metal group, where for example Al is the metal, of Formula AlCl, such a halo metal group coordinates with two positions of the phthalocyanine nucleus.

In oxy-metal groups the oxy is oxygen or hydroxy providing for example where Al is the metal an oxy-metal group such as AlOH, or where Ti is the metal an oxy-metal group such as TiO, such oxy-metal groups co-ordinate with two positions of the phthalocyanine nucleus.

It is preferred that R and $R^1$ each independently is selected from aryl, heterocyclic, alicyclic and alkyl radicals each of which is optionally substituted by one or more substituents where R or $R^1$ is an aryl or a heterocyclic radical it is preferred that each independently is selected from mono- or bi-cyclic aryl or heterocyclic radicals. Examples of suitable aryl or heterocyclic radicals are phenyl, naphthyl, pyridyl, quinolinyl, thienyl, furanyl, thiazolyl and benzothiazolyl. Where R or $R^1$ is an alicyclic radical it is preferred that each independently is $C_{4-8}$-cycloalkyl, more preferably cyclohexyl. Where R, $R^1$ or $R^2$ is an alkyl radical it is preferred that each independently is $C_{1-10}$-alkyl, more preferably $C_{1-6}$-alkyl and especially $C_{1-4}$-alkyl.

Where the organic radicals represented by R and $R^1$ are optionally substituted the substituents are selected from $C_{1-10}$-alkyl, preferably $C_{1-6}$-alkyl, $C_{1-10}$-alkoxy, preferably $C_{1-6}$-alkoxy, —CN, —NO$_2$, —CF$_3$, halogen, preferably —F, —Cl or —Br, —NR$^3$R$^4$, —OR$^3$, —SO$_2$NR$^3$R$^4$, —SO$_2$R$_3$, —CONR$^3$R$^4$, —COOR$^3$ and —COR$^3$ in which $R^3$ and $R^4$ each independently is selected from —H, $C_{1-6}$-alkyl, aryl, preferably phenyl and $C_{1-4}$-alkylaryl preferably benzyl. Especially preferred substituents for the organic radicals represented by R and $R^1$ are $C_{1-6}$-alkyl, —OR$^3$ in which $R^3$ is $C_{1-6}$-alkyl, and —NR$^3$R$^4$ in which $R^3$ and $R^4$ each independently is —H, $C_{1-6}$-alkyl, phenyl or $C_{1-4}$-alkylaryl.

Where $R^2$ represents optionally substituted alkyl the substituents are selected from —OH, halogen preferably —Cl, —Br or —F, —CN, —COOC$_{1-6}$-alkyl and phenyl.

Especially preferred organic radicals represented by R are phenyl and phenyl substituted by $C_{1-6}$-alkyl, particularly methyl, $C_{1-6}$-alkoxy, particularly methoxy or -NR$^3$R$^4$, particularly —NH$_2$.

a is preferably an average value from 15 to 8, more preferably from 15 to 10.

b is preferably an average value from 1 to 8, more preferably from 1 to 6.

Preferred compounds of Formula (1) are those in which M is Cu, R is 4-methylphenyl, $R^1$ is phenyl, 4-methylphenyl, 4-methoxyphenyl or 4-aminophenyl, $R^2$ is H, a is from 10 to 15 and b is from 1 to 6.

Especially preferred compounds of Formula (1) are tetradeca (4-methylphenylthio) mono (phenylamino)copper phthalocyanine, deca (4-methylphenylthio) penta (4-aminophenylamino)copper phthalocyanine, deca (4-methylphenylthio) penta (4-methoxyphenylamino) copper phthalocyanine and trideca (4-methylphenylthio) di (4-methylphenylamino) copper phthalocyanine.

The sulphonated derivatives of phthalocyanines of Formula (1) are preferably of the Formula (3):

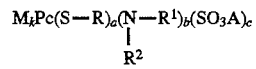

in which $M_kPc$, R, $R^1$, $R^2$, a and b are as hereinbefore defined, A is selected from H, a metal, ammonium or substituted ammonium and c is an average value of from 0.1 to 60.

The sulphonated derivatives of the phthalocyanines of Formula (3) preferably carry up to 40 SO$_3$A groups, more preferably up to 30 SO$_3$A groups and especially up to 16 SO$_3$A groups, which are attached to any of the groups represented by R, $R^1$ or $R^2$.

In the preferred sub group of sulphonated derivates of phthalocyanines of Formula (3) the average number of SO$_3$A groups is preferably from 2 to 40 and more preferably from 2 to 30 and especially from 4 to 16.

Where A is a metal ion it is preferably an alkali or alkaline earth metal ion, especially an alkali metal ion such as a sodium, potassium or lithium ion. Where A is an ammonium ion it is preferably $NH^+_4$ or a substituted ammonium ion which enhances the water-solubility of the compound or a substituted ammonium ion of the formula $NQ^+_4$ which enhances the alcohol solubility of the compound. Examples of suitable substituted ammonium ions which enhance the water solubility of the compound are mono, di, tri and tetra alkyl and hydroxyalkyl ammonium ions in which the alkyl groups preferably contain from 1 to 4 carbon atoms such as $N^+(CH_3)_4$; $N^+(C_2H_5)_4$; $N^+(C_2H_4OH)_4$; $NH^+_3 CH_3$; $NH^+_2 (CH_3)_2$ and $NH^+(CH_3)_3$.

In the substituted ammonium ion of the formula $NQ^+_4$ at least one Q is a fatty aliphatic group and any remaining Q groups are $C_{1-4}$-alkyl or H. The fatty aliphatic group represented by Q preferably contains from 4 to 16, more preferably 7 to 12 and especially preferably 7 to 9 carbon atoms. Preferably fatty aliphatic groups are alkyl and alkenyl groups which have straight- or branched-chains. Preferred alkyl groups, represented by Q, containing 8 or 9 carbon atoms are 3,5,5-trimethyl-hexyl, 1,1,3,3-tetramethylbutyl and 2-ethylhexyl. Examples of other suitable aliphatic chains are 1-ethyl-3-methylpentyl, 1,5-dimethylhexyl, 1-methylheptyl, 1,4-dimethylbutyl, 1,2,2-trimethylpropyl, 2-etkylbutyl, 1-propylbutyl, 1,2-dimethylbutyl, 2-methylpentyl, 1-ethylpentyl, 1,4-dimethylpentyl, 1-methylhexyl, 3-methylhexyl, 1,3,3-trimethylbutyl, 1-methylnonyl. The substituted ammonium ion represented by A preferably has one fatty alkyl group as described above, the remaining groups being preferred H or $C_{1-4}$-alkyl, especially H or methyl. Especially preferred ammonium ions include 2-ethylhexylammonium, 1,1,3,3-tetramethylbutylammonium and 3,5,5-trimethylhexylammonium.

In phthalocyanines cf Formula (3) the metal ion denoted by A is preferably an alkali or alkaline earth metal ion and more preferably is selected from lithium, sodium and potassium ion. It is especially preferred that A is a sodium or an ammonium ion or hydrogen.

The phthalocyanines of Formula (3) when prepared in or purified from aqueous media may crystallise in hydrated forms where up to 40 molecules of water of crystallisation are associated with the phthalocyanine, it is intended that Formula (3) includes such hydrated forms.

According to a further feature of the present invention there is provided a process for the preparation of a phthalocyanine of Formula (1):

Formula (1)

by reaction of a phthalocyanine of Formula (4):

Formula (4)

with a compound of Formula (5):

Formula (5)

in which d is from 15 to 16; and M, k, Pc, R, $R^1$ and $R^2$ are as hereinbefore defined.

The process may be performed by mixing the phthalocyanine of Formula (4) and the compound of Formula (5), optionally in the presence of an inert liquid, and heating at an elevated temperature. Suitable inert liquids are amides such as N-methylpyrollidone or dimethylformamide.

The process is preferably performed in the absence of the inert liquid.

The process is preferably performed at a temperature of from 100° C. to 250° C., more preferably at a temperature from 130° C. to 200° C. and especially at a temperature from 150° C. to 190° C.

The phthalocyanine of Formula (1) may be isolated from the reaction mixture by any convenient means for example by cooling the reaction mixture and pouring it into a liquid such as ethanol and filtering off the precipitated product. The product may be purified by washing with a liquid such as ethanol or by elution from silica using a liquid such as toluene as eluent.

The phthalocyanine of Formula (4) may be prepared by reaction of a compound of Formula (6):

Formula (6)

in which X is halogen such as —Cl or —Br and $M_k$ and Pc are as hereinbefore defined with a compound of Formula (7):

Formula (7)

in which R is as hereinbefore defined. The reaction may be performed as a melt or in an inert liquid such as nitrobenzene, dimethyl formamide or N-methyl-2-pyrrolidone at elevated temperature of from 80° C. to 300° C.

The compound of Formula (6) may be prepared by reacting a tetrahalo-1,2-dicyanobenzene with an appropriate metal or metal salt in an inert organic liquid at an elevated temperature.

The sulphonated phthalocyanines cf Formula (2) can be prepared by sulphonating a precursor of a phthalocyanine of Formula (2) in which c is 0, using sulphuric acid which may contain excess $SO_3$ (oleum). The strength of acid may vary within wide limits from 1% sulphuric acid up to 30% oleum. It is preferred that the strength of acid is from 50% sulphuric acid up to 30% oleum, it is especially preferred that the strength of acid is from 98% sulphuric to 30% oleum. The reaction temperature may vary from −10° C. to 600°C. depending on the extent of sulphonation required. Sulphonation may be performed in an inert liquid.

As the concentration of the sulphuric acid or the oleum is increased at a fixed reaction temperature, more sulphonic acid groups are introduced into the phthalocyanine. Similarly as the reaction temperature is increased at a particular acid strength, more sulphonic acid groups are introduced into the phthalocyanine.

In the sulphonation reaction a preferred acid is 10% oleum and a preferred reaction temperature is from −10° C. to 40° C., especially from 10° C. to 40° C.

The phthalocyanines of the present invention are useful for absorbing electro-magnetic radiation from for example a laser source and may be used in a coating for optical data storage disks, or in security applications such as printing banknotes or cheques, or in the preparation of lithographic printing plates or in washing powders to assist in bleaching.

The invention is further illustrated by the following examples:

EXAMPLE 1

Mono(phenylamino)tetradeca(4-methylphenylthio)copper phthalocyanine i) Preparation of pentadeca(4-methylphenylthio)copper phthalocyanine.

4-Methylthiophenol (12.4 parts), potassium hydroxide (5.6 parts) and dimethylformamide (20 cm³) were heated to 80°–85° C. with stirring for 60 minutes before cooling to 60°

C. and adding pentadecachlorocopper phthalocyanine (VYNAMON Green 2GFW) (5.68 parts). The reaction mixture heated to 130° C. with stirring for a further 60 minutes.

The reaction mixture was filtered, the liquors poured into ethanol 740P (200 cm³), the resulting precipitate was filtered, washed colour free with ethanol 740P (500 cm³) and dried at 50° C.

The product was obtained as a brown solid (7.7 parts, 70%), m.p. 104°–115°, λmax (CHCl₃) 776 cm⁻¹.

ii) Pentadeca(4-methylphenylthio)copper phthalocyanine (5.0 parts) and aniline (51 parts) were heated to 180° C. with stirring for 16 hours. The mixture was poured into ethanol 740P (400 cm³) and a fine black solid precipitated. The solution was filtered and the black solid was dissolved in dichloromethane. Silica was added to the solution and the solvent was removed under reduced pressure to give a fine, black powder. The powder was applied to a silica column using toluene as eluent. All similar fractions were collected and the solvent removed under reduced pressure to give a black solid (3.4 parts, 69%), m.p. 110°–114° C., λmax(CH₂Cl₂) 793 cm⁻¹.

EXAMPLE 2

Penta(4-aminophenylamino)deca(4-methylphenylthio)copper phthalocyanine

Pentadeca(4-methylphenylthio)copper phthalocyanine (2.41 parts) and p-phenyldiamine (22 parts) were melted and stirred at 180° C. for 16 hours and then cooled to 100° C. Ethanol 740P (100 cm³) was added to the stirred gum. A black/purple solid precipitated and was filtered off. The solid was washed with ethanol 740P (100 cm³), slurried in hot ethanol 740p (4×200 ml) filtered and dried (1.85 parts 80%), m.p.>250° C., λmax (CHCl₃) 870 cm⁻¹.

EXAMPLE 3

Penta(4-methoxyphenylamino)deca(4-methylphenylthio)copper phthalocyanine

Pentadeca(4-methylphenylthio)copper phthalocyanine (2.41 parts) and 4-anisidine (25.0 parts) were heated together at 160°–180° C. for 18 hours. The reaction mixture was cooled to 80°–85° C., ethanol 740P (70 cm³) was added and the product filtered and washed almost colour-free with ethanol 740P (200 cm³). The residue was boiled in ethanol (100 cm³) filtered and washed with hot ethanol (30 cm³) to remove residual 4-anisidine. The process was repeated to give an almost-black powder free from residual 4-anisidine m.p. 185° C., λ(max) (CH₂Cl₂) 860 cm⁻¹.

EXAMPLE 4

Di(4-methylphenylamino)trideca(4-methylphenylthio)copper phthalocyanine

As described in Example 3, except 4-toluidine (21.7 parts) used in place of 4-anisidine. The product had ampt 165–°170° C. and λ(max) (CH₂Cl₂) 826 cm⁻¹.

EXAMPLE 5

Tri(4-methoxyphenylamino) dodeca (4-methylphenylthio)copper phthalocyanine

Pentadeca(4-methylphenylthio)copper phthalocyanine (2.41 parts) and 4-anisidine (2.5 parts) were heated together, at 160°–180° C., in N-methyl pyrollidone (10 parts) for 18 hours.

The reaction mixture was cooled, poured into ethanol (740P, 100 cm³) and the green-black precipitate filtered, washed with ethanol (100 cm³) then re-slurried in a further 100 cm³ ethanol, re-filtered, washed and dried at 50° C. to give Tri(4-methoxyphenylamino) dodeca (4-methylphenylthio) copper phthalocyanine (2.0 parts, 83%), λ max (CH₂Cl₂) 828 cm⁻¹.

EXAMPLE 6

Tri(4-methoxyphenylamino) dodeca (4-methylphenylthio) nona (sulphonic acid sodium salt)copper phthalocyanine The material from 1 (above) (4.6 parts) was added to 10% oleum (10.4 pts) at 0°–0.50° C. and after 15 minutes at this temperature, the reaction was allowed to reach room temperature and stirring maintained a further 3 hours at this temperature prior to pouring onto ice (100 parts).

After neutralisation with sodium hydroxide, the solution was dialysed and evaporated to dryness to give tri(4-methoxyphenylamino) dodeca (4-methylphenylthio) nona (sulphonic acid sodium salt)copper phthalocyanine (6.3 parts, 91%), mp >2500, λ max (H₂O) 800 cm⁻¹.

We claim:

1. A process for the preparation of a phthalocyanine of Formula (1):

Formula (1)

by reaction of a phthalocyanine of Formula (4):

$$M_kPc(S-R)_d$$ Formula (4)

with a compound of Formula (5):

$$H-NR^1R^2$$ Formula (5)

in which d is from 15 to 16;

M$_k$Pc is a phthalocyanine nucleus of Formula (2):

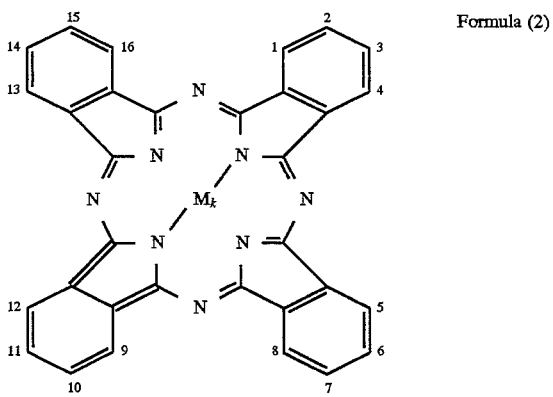

Formula (2)

M is a metal atom, a chloro-metal group, and oxy-metal group or hydrogen;

k is inverse of ½ valency of M; R and R¹ each independently is an organic radical;

R² is H or optionally substituted alkyl;

a is an average value from 15 to 8;

b is an average value from 1 to 8; and a+b is from 15 to 16 and sulphonated derivatives thereof.

* * * * *